United States Patent [19]

Sturgis

[11] 4,105,046

[45] Aug. 8, 1978

[54] DETACHABLE FLUID COUPLING

[76] Inventor: Clifford M. Sturgis, 1213 Westmoreland, Colorado Springs, Colo. 80907

[21] Appl. No.: 783,494

[22] Filed: Mar. 31, 1977

[51] Int. Cl.² .......................................... F16L 37/12
[52] U.S. Cl. ............................ 137/594; 251/149.6; 285/1; 285/137 R
[58] Field of Search ............... 137/594, 595, 614.02, 137/614.03, 614.04; 285/1, 137 R; 251/149.1, 149.6

[56] References Cited

U.S. PATENT DOCUMENTS

| 2,930,633 | 3/1960 | Ethington | 137/614.04 X |
| 3,886,970 | 6/1975 | Barlow | 137/614.02 X |

Primary Examiner—Robert G. Nilson
Attorney, Agent, or Firm—Fishburn, Gold & Litman

[57] ABSTRACT

A detachable fluid coupling for fluid hoses or conduits used in pneumatic or hydraulic systems, such as between tractors and towed equipment, such as implements or trailers, includes a retaining mechanism with one portion having a connector releasably engageable with a member or device holding or connected to a pair of such fluid conduits from the towed equipment for retaining coupling portions thereof in position respectively received and coupled to a pair of members or coupling parts operatively connected to a respective pair of fluid conduits of a fluid pressure system, such as from a tractor. The fluid coupling includes a ramp positioned to be engaged by one end of a trip member pivotable about a pin to thereby move another end of the trip member into engagement with said one portion and move the connector portion thereof out of engagement with the holding device in response to separation of the towing connection and relative separation of the tractor and towed equipment.

12 Claims, 6 Drawing Figures

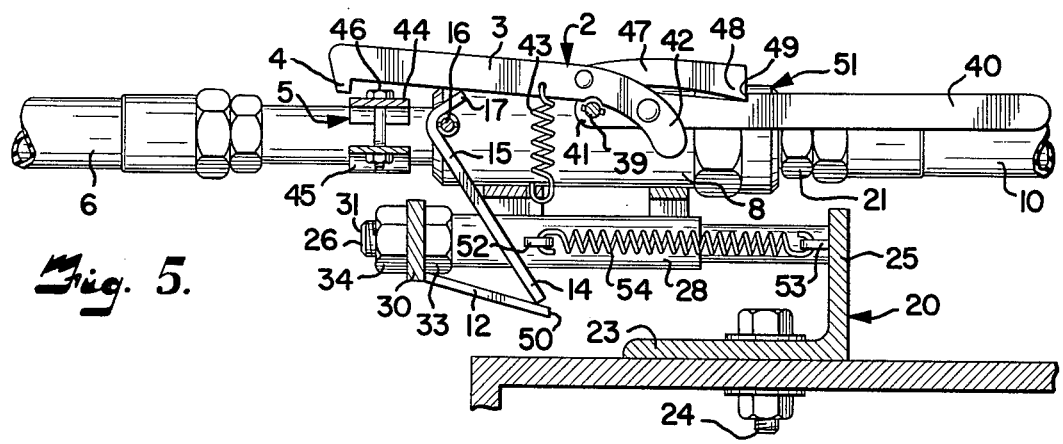
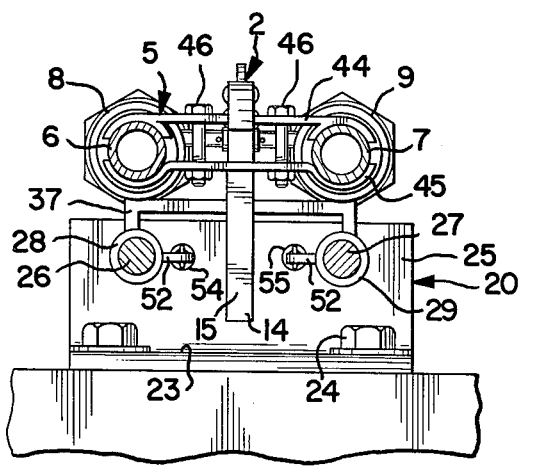
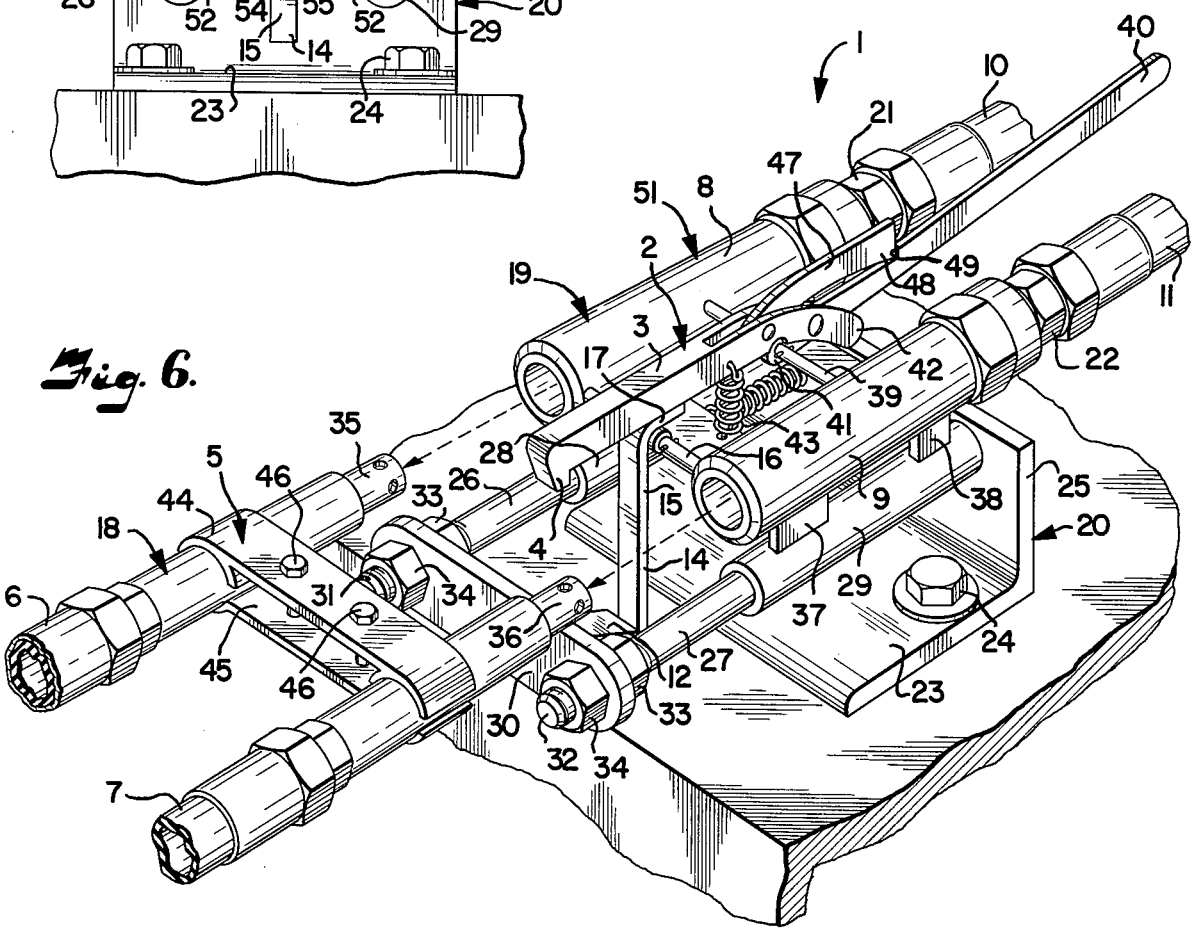

DETACHABLE FLUID COUPLING

The present invention relates to detachable fluid couplings for fluid hoses or conduits used in pneumatic or hydraulic systems and more particularly to a fluid coupling having means mounted on a plurality of fluid conduits of a fluid operator and engageable with a ramp member and one portion of a retaining mechanism for moving a connector portion thereof out of retaining engagement with a holding device on the conduits in response to separation of the fluid operator from a structure having a source of fluid pressure.

The present invention is particularly useful as a coupling connector and disconnector for fluid conduits or hoses used in hydraulic or pneumatic systems of a prime mover towing a vehicle or piece of equipment which utilizes hydraulic or pneumatic controls routed from the hydraulic or pneumatic pressure system of the prime mover.

It is conventional to have some method of disconnecting the hydraulic or pneumatic system of the prime mover to the towed vehicle, equipment, or implement so that same can be connected and disconnected to the prime mover without the necessity of involved hydraulic or pneumatic hose and couplings. The conventional device consists of a pair of hydraulic or pneumatic hoses leading from the hydraulic or pneumatic pressure supply of the prime mover to a pair of connector couplings which in turn may be selectively connected or disconnected to corresponding couplings attached to the piece of equipment being operated by the prime mover. These couplings usually involve male and female connections with spring-loaded ball type valves incorporated therein in order to avoid loss of fluid when connecting and disconnecting.

When, for example, the prime mover is operating an implement in the field and when said implement is controlled by or includes fluid pressure operators, there is always the danger present that if the towed implement breaks away from the tractor, the fluid hoses will be broken or the coupling destroyed before the operator of the prime mover is aware that the implement has broken away. Such damage requires a relatively expensive and time consuming repair and the present device not only provides a coupling which facilitates the connection, but enables same to be uncoupled or break away without damage or loss of fluid or oil occurring.

The essence of the invention is, therefore, providing a male and female coupling for fluid pressure hoses with one portion of the coupling being secured to the prime mover and the other portion being secured to the device being operated by fluid pressure from the prime mover.

The principal objects of the present invention are: to provide a detachable fluid coupling having an easy and safe means for urging fluid conduits of a fluid operator into and releasably retaining same in a coupled position; to provide such a detachable fluid coupling with components thereof arranged so that hydraulic or air conduits cannot be hooked up wrong; to provide such a detachable fluid coupling operating in response to relative separation movement of a prime mover and towed vehicle to release the device that holds the mating coupling parts in coupled operative position; to provide such a detachable fluid coupling with a trip member allowing fluid conduits of the fluid operator to be uncoupled without damage thereto in response to separation of the fluid operator, such as an implement, from a structure having a source of fluid pressure, such as a prime mover; to provide such a detachable fluid coupling having linkage members movable to a first position for holding components in a coupled position and to a second position allowing uncoupling of the components; and to provide such a detachable fluid coupling which is economical to manufacture, positive in operation, durable in construction, and particularly well adapted for the proposed use.

Other objects and advantages of this invention will become apparent from the following description taken in connection with the accompanying drawings wherein are set forth, by way of illustration and example, certain embodiments of this invention.

The drawings constitute a part of the specification and includes an exemplary embodiment of the present invention and illustrate various objects and features of the detachable fluid coupling.

FIG. 4 is a transverse sectional view taken on line 4—4 of FIG. 2 and showing a holding device for holding a plurality of fluid conduits of a fluid operator in position for coupling with a like plurality of valve members of the coupling.

FIG. 5 is a longitudinal sectional view taken on line 5—5 of FIG. 3 and showing the movable assembly of the coupling in an extreme position on the support frame just prior to separation of the coupling.

FIG. 6 is a perspective view showing the coupling in an uncoupled position.

Figure 1:
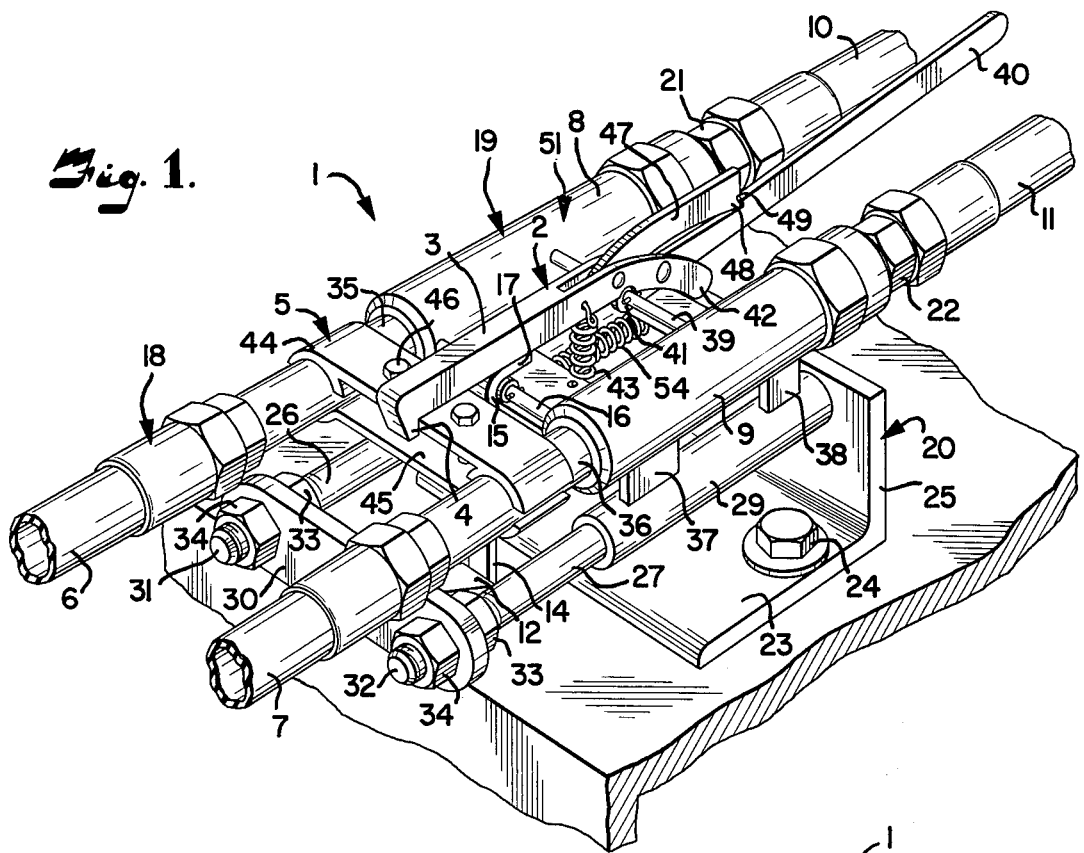
FIG. 1 is a perspective view of a detachable fluid coupling embodying features of the present invention and shown connected together.

As required, detailed embodiments of the present invention are disclosed herein. However, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

Referring more in detail to the drawings:

In the disclosed embodiments of the present invention, the reference numeral 1 designates generally a detachable fluid coupling for fluid hoses or conduits used in pneumatic or hydraulic systems, such as between tractors and towed equipment, such as implements or trailers. The detachable fluid coupling 1 includes a retaining mechanism or linkage 2 with a retaining portion or link 3 thereof having a connector in the form of a latch or hook portion 4 releasably engageable with a member or device 5 holding or connected to a pair of fluid conduits 6 and 7 of a fluid operator (not shown), such as an implement, in position to be respectively received in and coupled to coupling parts in the form of a pair of valve members 8 and 9 having operatively connected thereto a respective pair of fluid conduits 10 and 11 for a fluid pressure system (not shown), such as from a tractor. The fluid coupling 1 includes a ramp member 12 positioned to be engaged by one leg 14 of a trip member 15 pivotable about pivot pin 16 to thereby move an other leg 17 of the trip member 15 into engagement with the retaining portion or link 3 and move the connector or hook portion 4 of the retaining link 3 out of engagement with the holding device 5 in response to separation of the towing connection and relative separation of the tractor and towed equipment.

The fluid operator conduits 6 and 7, the valve members 8 and 9, and the fluid conduits 10 and 11 of the fluid pressure system provide a fluid pressure supply path from the fluid pressure system of the prime mover to the fluid operator and a fluid return path from the fluid operator to a reservoir on the prime mover.

The fluid coupling 1 has components on male and female coupling portions 18 and 19 respectively thereof adapted to selectively lock the coupling portions 18 and 19 into flow permitting engagement with one another against disengagement below a predetermined breakaway tension which occurs when a prime mover moves away from a towed vehicle or implement. Such breakaway tension occurs when the slack is removed from the fluid conduits 6 and 7 of the fluid operator.

The fluid coupling 1 includes a suitable support frame or member 20 adapted to be mounted on a structure, such as a prime mover (not shown), having thereon a fluid pressure system including the fluid conduit 10 and 11 which have free end portions 21 and 22 respectively positioned adjacent the support member 20 and operatively connected to the valve members 8 and 9 respectively, thereby defining the female portion 19 of the fluid coupling 1.

Figure 2:
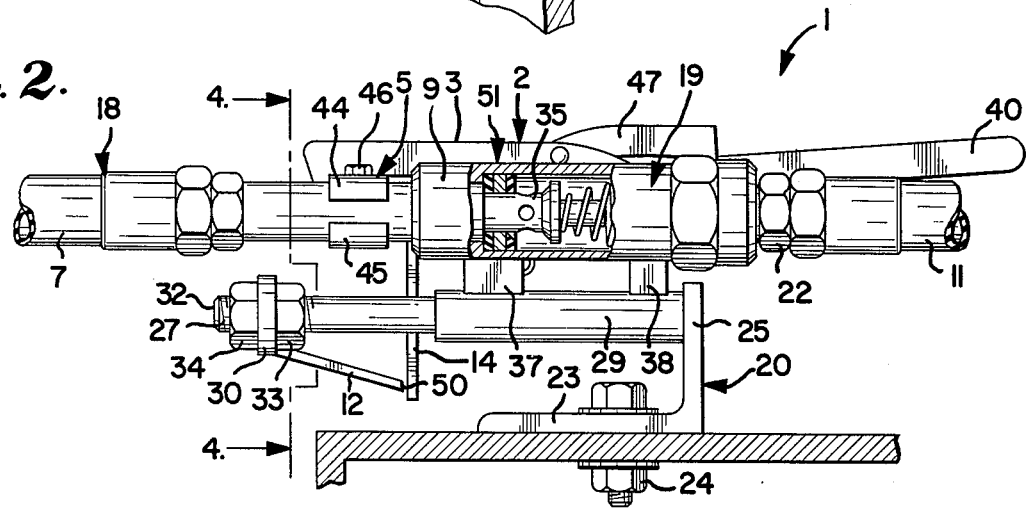
FIG. 2 is a side elevational view of the detachable fluid coupling and shown connected together.
Figure 3:
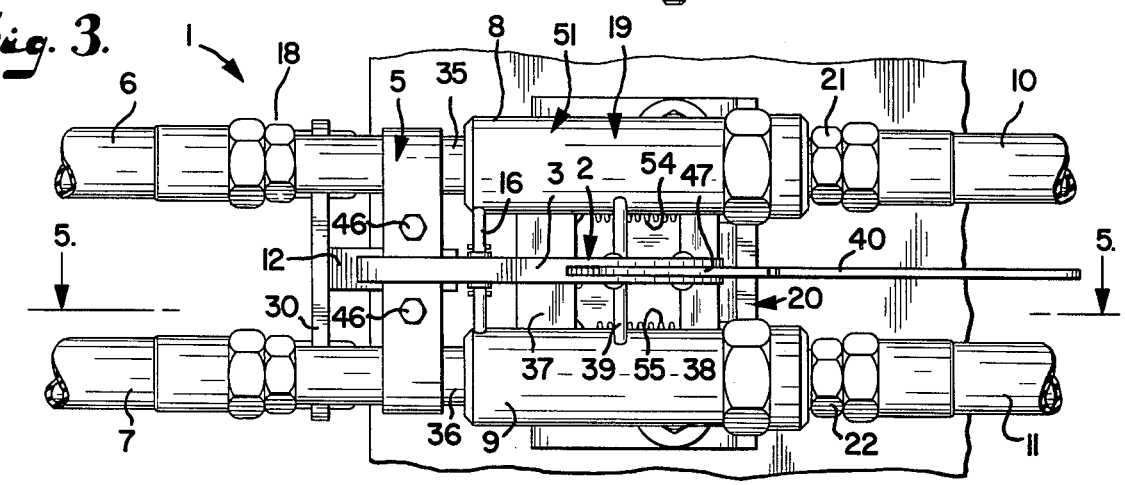
FIG. 3 is a top plan view of the detachable fluid coupling and shown connected together.

The support member 20 may be any suitable structural member. In the illustrated embodiment, the support member 20 is an angle having a first leg 23 positioned substantially horizontal, as seen in FIG. 2. The first leg 23 has a plurality of apertures therein adapted to receive suitable fastening devices 24, such as bolts and nuts. The illustrated angle has a second leg 25 substantially perpendicular to the first leg 22.

A pair of laterally spaced guide rods 26 and 27 are mounted on the second leg 25 of the support member 20 and extend therefrom. The guide rods 26 and 27 are positioned in spaced relation with the first leg 23 and substantially parallel therewith. A pair of tubular guide sleeves 28 and 29 are received respectively on the guide rods 26 and 27 and a transverse lar 30 is attached to the free ends 31 and 32 respectively of the guide rods 26 and 27. In the illustrated embodiment, the free ends 31 and 32 are threaded and a first pair of nuts 33 are threaded thereon. The bar 30 is mounted on the guide rods 26 and 27 with the free ends 31 and 32 thereof received in laterally spaced apertures in the bar 30. A second pair of nuts 34 are threaded onto the free ends 31 and 32 to secure the transverse bar 30 thereon.

The valve members 8 and 9 are components of the female portion 19 of the coupling 1 and include elongated housings having a suitable means therein adapted to receive the free end portions 21 and 22 of the fluid conduit 10 and 11 of the fluid pressure system for connection thereto. The valve members 8 and 9 are adapted to detachably receive and seat therein free end portions 35 and 36 of the fluid conduits 6 and 7 respectively of the fluid operator (not shown) in a flow permitting position.

The valve members 8 and 9 are preferably adapted to close when the fluid operator conduits 6 and 7 are detached from the valve members 8 and 9 and to open in response to connection thereto of the fluid conduit 6 and 7 of the fluid operator (not shown).

At least one and preferably a pair of longitudinally spaced mounting members 37 and 38 are mounted on and extend between the guide sleeves 28 and 29. The valve members 8 and 9 are suitably connected to the mounting member or members, as by welding. The valve members 8 and 9 are laterally spaced and positioned above and preferably substantially parallel with the guide sleeves 28 and 29.

A pivot pin 39 extends between and has opposite ends thereof connected to the valve members 8 and 9, as by being welded to the housings thereof. The mechanism or linkage 2 is mounted on the pivot pin 39 which defines the axis of movement thereof.

The linkage 2 includes a first lever member 40 pivotally mounted between and relative to the valve members 8 and 9 and having one end portion 41 thereof pivotally mounted on the pivot pin 39. The first lever member 40 is illustrated as an elongated bar or rod extending toward the structure having the source of fluid pressure when components of the coupling 1 are connected together.

The linkage 2 includes a second lever member in the form of the retaining link 3 which has one end portion 42 thereof pivotally mounted on the first lever member 40. The one end portion 42 of the retaining link 3 is spaced from the one end portion 41 of the first lever member 40 and is thereby spaced from the pivot pin 39. The hook portion 4 is formed on the other end portion of the retaining link 3. In the illustrated embodiment, the retaining link 3 is a bifurcated member having spaced tines with the first lever member 40 positioned therebetween. A resilient member or tension spring 43 is attached to the retaining link 3 intermediate the ends thereof and to the mounting member 37 for retaining the hook portion 4 in releasable engagement with the holding device 5.

The holding device 5 is mounted on the fluid conduits 6 and 7 of the fluid operator (not shown) for positioning said conduits to have the free end portions 35 and 36 thereof received in the valve members 8 and 9 respectively. The holding device 5 and the conduits 6 and 7 define the male portion 18 of the coupling 1 which is adapted to be engaged by the hook portion 4 of the retaining link 3 to thereby retain the fluid operator conduits 6 and 7 in flow permitting position.

In the illustrated embodiment, the holding device 5 includes first and second clamp members 44 and 45 each having an intermediate portion positioned between the fluid operator conduits 6 and 7 and opposite end portions each of a shape adapted to engage and thereby position respective fluid operator conduits 6 and 7. The end portions of the clamp members 44 and 45 are illustrated as concave to receive round tubular members. The clamp members 44 and 45 are positioned in opposed and facing relation with the fluid operator conduits 6 and 7 therebetween and received within the end portions thereof. The clamp members 44 and 45 are held in clamping engagement with the fluid operator conduits 6 and 7 by suitable fastening devices 46, such as bolts and nuts.

The first lever 40, the retaining link 3, and the spring 43 cooperate in insertion and retention of the free ends 35 and 36 of the conduits 6 and 7 in flow permitting position in the valve members 8 and 9. When coupling the male and female portions 18 and 19, the first lever 40 and the retaining link 3 are lifted, the free ends 35 and 36 are inserted respectively into the valve members 8 and 9, the link 3 is released to engage the hook portion 4 thereof with the top clamp member 44, and the first lever 40 is lowered to pull the free ends 35 and 36 into the proper positions within the valve members 8 and 9.

In order to prevent inadvertent separation of the coupling 1 by accidental lifting of the first lever 40, a safety pawl 47 is included on the linkage 2. The pawl 47 is pivotally mounted on the retaining link 3 and has a heel portion 48 spaced from the pivot thereof which is engageable with a shoulder 49 formed on the first lever 40. In order for relative pivoting to occur between the retaining link 3 and the first lever 40, it is necessary to lift the pawl 47 out of engagement with the shoulder 49. However, the linkage 2, including the first lever 40, the retaining link 3, and the safety pawl 47, may move as a unit about the pivot pin 39 and against the force of the spring 43 as during disengagement of the hook portion 4 from the holding device 5.

The ramp member 12 is a portion of the female portion 19 of the coupling 1 and is mounted on the transverse bar 30 and extends therefrom. The ramp member 12 is positioned between the guide rods 26 and 27 and has a free end 50 spaced from the transverse bar 30. The ramp member 12 is inclined downwardly extending toward the support member 20, as seen in FIG. 2.

The valve members 8 and 9, the sleeve guides 28 and 29, the mounting members 37 and 38, and the linkage 2 comprise a movable assembly 51 which is slidable along the guide rods 26 and 27 from a position adjacent the support member leg 25 to a position adjacent the transverse bar 30 in response to tension in the conduits 6 and 7. The trip member 15 is illustrated as L-shaped member pivotally mounted on the pivot pin 16 with one leg 17 engaging the retaining link 3 and the other leg 14 engageable with the ramp 12. Sliding of the movable assembly 51 to the position adjacent the transverse bar 30 brings the leg 14 into contact with the free end 50 of the ramp 12 which pivots the trip member 15, causing the leg 17 to push the retaining link hook portion 4 free from the top clamp member 44 and allowing the male portion 18 to separate from the female portion 19.

In order to prevent undesired separation of the coupling 1 due to the weight of the conduits 6 and 7 or to vibrations of the vehicle on which the coupling 1 is mounted, the movable assembly 51 is resiliently urged toward the position adjacent the support leg 25. The sleeve guides 28 and 29 each have an ear 52 extending therefrom, and a pair of ears 53 extends from the support leg 25 toward the transverse bar 30. The tension springs 54 and 55 are mounted respectively on the sleeve guides 28 and 29 on the ears 52 thereof and extend toward and are attached to the respective support leg ears 53. A force of a certain magnitude, less than that which would damage either the conduits 6 and 7 or the coupling 1, must be overcome to move the assembly 51 toward the transverse bar 30.

Relative movement between the fluid operator and the vehicle having the fluid pressure system thereon effects removal of slack in the fluid operator conduits 6 and 7, slides the movable assembly 51 toward the transverse bar 30 which brings about separation of the coupling 1, as described, and closes the valve members 8 and 9 as described.

It is to be understood that while I have illustrated and described one form of my invention, it is not to be limited to the specific form or arrangement of parts herein described and shown.

What I claim and desire to secure by Letters Patent is:

1. A detachable fluid coupling for connecting a source of fluid pressure to a fluid operator, said fluid coupling comprising:

(a) a support frame mounted on a structure having a source of fluid pressure including a plurality of fluid conduits with respective free ends thereof positioned adjacent one end of said support frame;
  (b) a plurality of valve members slidably mounted for simultaneous longitudinal movement on said support frame and each having a respective one of the free ends of said fluid conduits connected thereto, said valve members each detachably receiving a respective one of a plurality of fluid conduits of a fluid operator;
  (c) a first lever member positioned between said valve members and having one end portion thereof pivotally mounted on at least one of said valve members;
  (d) a second lever member having one end portion thereof pivotally connected to said first lever member, said one end portion of said second lever member being spaced from said one end portion of said first lever member, said second lever member having a hook portion on the other end portion thereof;
  (e) holding means mounted on the plurality of fluid operator conduits for positioning same to be received in said respective valve members and engageable by said second lever hook portion for retaining said fluid operator conduits in flow permitting position;
  (f) a ramp member mounted on another end of said support frame and extending therefrom, said ramp member being positioned between said valve members; and
  (g) uncoupling means mounted on the plurality of valve members and engageable with said ramp member and said second lever member for moving said hook portion thereof out of engagement with said holding means in response to separation of the fluid operator from the structure having the source of fluid pressure.

2. A detachable fluid coupling as set forth in claim 1 wherein:

(a) a free end of said ramp member is spaced from said support frame one end;
  (b) a plurality of guide rods are mounted on said support frame and extend parallel with said valve members; and
  (c) said valve members are mounted on at least one transverse mounting member, said mounting member being mounted on a plurality of guide sleeves slidably mounted on said guide rods whereby sliding of said valve members with said uncoupling means thereon to a position adjacent said support frame other end in response to separation of said fluid operator from said structure having the source of fluid pressure causes said uncoupling means to engage said ramp member free end and to thereby move said hook portion out of engagement with said holding means.

3. A detachable fluid coupling as set forth in claim 2 wherein resilient means extend between said mounting member and said second lever member for resiliently retaining said hook portion thereof in engagement with said holding means.

4. A detachable fluid coupling as set forth in claim 2 wherein resilient means extend between said support frame one end and the assembly comprising said valve members, said mounting member, and said guide sleeves.

5. A detachable fluid coupling as set forth in claim 1 wherein said uncoupling means includes:
   (a) a trip member having a second lever engaging leg and a ramp engaging leg; and
   (b) a pivot pin extending between said valve members, said trip member being pivotally mounted on said pivot pin.

6. A detachable fluid coupling as set forth in claim 5 wherein:
   (a) a free end of said ramp member is spaced from said support frame one end;
   (b) a plurality of guide rods are mounted on said support frame and extend parallel with said valve members; and
   (c) said valve members are mounted on at least one transverse mounting member, said mounting member being mounted on a plurality of guide sleeves slidably mounted on said guide rods.

7. A detachable fluid coupling as set forth in claim 6 wherein resilient means extend between said mounting member and said second lever member for resiliently retaining said hook portion thereof in engagement with said holding means.

8. A detachable fluid coupling as set forth in claim 6 wherein resilient means extend between said support frame other end and the assembly comprising said valve members, said mounting member, and said guide sleeves.

9. A detachable fluid coupling for connecting a source of fluid pressure to a fluid operator, said fluid coupling comprising:
   (a) a support frame mounted on a structure having a source of fluid pressure including a pair of fluid conduits with respective free ends thereof positioned adjacent one end of said support frame, said support frame including a support base having a pair of parallel, longitudinal guide rods extending therefrom with a transverse bar mounted on the free ends of said guide rods;
   (b) a pair of guide sleeves each slidably mounted on a respective one of said guide rods;
   (c) a pair of transverse mounting members mounted on and extending between said guide sleeves whereby said guide sleeves are slidable in unison;
   (d) a pair of valve members mounted on said mounting members and each having a respective one of the free ends of said fluid conduits connected thereto, said valve members each detachably receiving a respective one of a pair of fluid conduits of a fluid operator;
   (e) a pivot pin mounted on and extending between said valve members;
   (f) a first lever member positioned between said valve members and having one end portion thereof pivotally mounted on said pivot pin;
   (g) a second lever member having one end portion thereof pivotally connected to said first lever member, said one end portion of said second lever member being spaced from said pivot pin, said second lever member having a hook portion on the other end portion thereof;
   (h) holding means mounted on the pair of fluid conduits of the fluid operator for positioning same to be received in said respective valve members, said holding means being engageable by said hook portion of said second lever member for retaining same in flow permitting position;
   (i) a ramp member mounted on another end of said support frame and extending therefrom, said ramp member being positioned between said valve members; and
   (j) an L-shaped trip member pivotally mounted on a trip member pivot pin extending between said valve members, said trip member having a ramp engaging leg and a second lever engaging leg whereby said trip member moves said second lever hook portion out of engagement with said holding means in response to separation of the fluid operator from the structure having the source of fluid pressure.

10. A detachable fluid coupling as set forth in claim 9 including:
    (a) first resilient means extending between one of said mounting members and said second lever member for resiliently retaining said hook portion thereof in engagement with said holding means; and
    (b) second resilient means extending between said support frame one end and said guide sleeves.

11. A detachable fluid coupling for connecting a source of fluid pressure to a fluid operator, said fluid coupling comprising:
    (a) a support frame mounted on a structure having a source of fluid pressure;
    (b) a female coupling portion having a plurality of valve members each operatively connected to the source of fluid pressure, said female coupling portion being slidably mounted on said support frame;
    (c) a male coupling portion having a plurality of fluid conduits of a fluid operator mounted thereon and each being detachably received in a respective one of said valve members;
    (d) holding means mounted on the plurality of fluid conduits of the male coupling portion for positioning same to be received in said respective valve members;
    (e) a retaining mechanism mounted on said female coupling portion and having a connector portion releasably engageable with said holding means of said male coupling portion, said retaining mechanism including:
       (1) a first lever member having one end portion thereof pivotally mounted on said female coupling portion; and
       (2) a second lever member having one end portion thereof pivotally connected to said first lever member, said one end portion of said second lever member being spaced from said one end portion of said first lever member, said second lever member having said connector portion on the other end portion thereof;
    (f) a ramp member mounted on said support frame and extending therefrom; and
    (g) uncoupling means mounted on said female coupling portion and engageable with said ramp member and said connector portion of said retaining mechanism for moving said connector portion out of engagement with said holding means in response to separation of the source of fluid pressure from the fluid operator, said uncoupling means including a trip member pivotally mounted on said female coupling portion and having one end engaging said second lever member and another end engageable with said ramp member in response to said female coupling portion sliding to a selected position on said support frame whereby said trip member one end urges said connector portion out of engagement with said holding means in response to said trip member other end engaging said ramp member.

12. A detachable fluid coupling as set forth in claim 11 wherein:
(a) said trip member is an L-shaped member having a second lever engaging leg and a ramp engaging leg; and
(b) said trip member is pivotally mounted on a pivot pin extending between said valve members.

* * * * *